(12) United States Patent
Karp et al.

(10) Patent No.: US 11,784,947 B2
(45) Date of Patent: *Oct. 10, 2023

(54) SYSTEM AND METHOD FOR PROACTIVE INTERVENTION TO REDUCE HIGH COST CHANNEL USAGE

(71) Applicant: Capital One Services, LLC, McLean, VA (US)

(72) Inventors: Scott Karp, Vienna, VA (US); Erik Mueller, Chevy Chase, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/934,761

(22) Filed: Sep. 23, 2022

(65) Prior Publication Data

US 2023/0123592 A1 Apr. 20, 2023

Related U.S. Application Data

(63) Continuation of application No. 16/868,717, filed on May 7, 2020, now Pat. No. 11,456,977, which is a continuation of application No. 16/003,668, filed on Jun. 8, 2018, now Pat. No. 10,680,979.

(51) Int. Cl.
*H04L 51/02* (2022.01)

(52) U.S. Cl.
CPC .................. *H04L 51/02* (2013.01)

(58) Field of Classification Search
CPC ....... H04L 51/02; H04L 41/16; H04L 41/127; H04L 47/823; H04L 47/783; H04L 47/781; H04L 47/522; H04L 12/40065; H04L 2012/5632; H04L 2012/6456; H04W 52/223; H04W 40/18; H04W 28/0215; H04W 28/0804; H04W 72/0486; H04W 72/12; H04W 72/0493; H04W 72/06; G06F 9/50; H04N 21/2385; H04N 21/24

See application file for complete search history.

(56) References Cited

U.S. PATENT DOCUMENTS

| | | |
|---|---|---|
| 6,295,294 B1 | 9/2001 | Odlyzko |
| 6,721,780 B1 | 4/2004 | Kasriel et al. |
| 6,850,252 B1 | 2/2005 | Hoffberg |
| 8,019,834 B2 | 9/2011 | Horvitz et al. |

(Continued)

*Primary Examiner* — Michael Won
(74) *Attorney, Agent, or Firm* — DLA PIPER LLP (US)

(57) ABSTRACT

Embodiments disclosed herein generally relate to a system and method for proactively generating an intervening message for a remote client device in response to an anticipated user action. A computing system receives one or more streams of user activity. The one or more streams of user activity include interaction with a server of an organization via an application executing on the remote client device. The computing system inputs the one or more streams of user activity into a prediction model. The computing system identifies an anticipated user action based on a prediction output from the prediction model. The computing system determines, based on a solution model, a proposed solution to the anticipated user action. The computing system generates an anticipated message to be transmitted to the remote client device of the user. The computing system transmits the anticipated message to the remote client device of the user.

20 Claims, 10 Drawing Sheets

(56) References Cited

U.S. PATENT DOCUMENTS

| | | |
|---|---|---|
| 8,417,715 B1 | 4/2013 | Bruckhaus et al. |
| 9,015,099 B2 | 4/2015 | Nitz et al. |
| 9,065,915 B1 | 6/2015 | Lillard et al. |
| 9,536,248 B2 | 1/2017 | Kannan et al. |
| 10,540,223 B1 | 1/2020 | Johansson et al. |
| 10,554,817 B1 | 2/2020 | Sullivan et al. |
| 2003/0105589 A1 | 6/2003 | Liu et al. |
| 2003/0161451 A1 | 8/2003 | Fitzpatrick et al. |
| 2004/0061718 A1 | 4/2004 | Fitzpatrick et al. |
| 2005/0055433 A1 | 3/2005 | Mathew et al. |
| 2006/0031340 A1 | 2/2006 | Mathew et al. |
| 2008/0154625 A1 | 6/2008 | Serbanescu |
| 2009/0228566 A1 | 9/2009 | Sharp et al. |
| 2010/0094791 A1 | 4/2010 | Miltonberger |
| 2010/0262467 A1 | 10/2010 | Barnhill, Jr. et al. |
| 2011/0167110 A1 | 7/2011 | Hoffberg et al. |
| 2013/0268468 A1 | 10/2013 | Vijayaraghavan et al. |
| 2013/0283168 A1 | 10/2013 | Brown et al. |
| 2015/0019637 A1 | 1/2015 | Backholm |
| 2015/0074215 A1 | 3/2015 | Arquette et al. |
| 2015/0163121 A1 | 6/2015 | Mahaffey et al. |
| 2015/0185995 A1 | 7/2015 | Shoemaker et al. |
| 2016/0140567 A1 | 5/2016 | Hanna et al. |
| 2016/0173428 A1 | 6/2016 | Balasubramanian et al. |
| 2016/0173616 A1 | 6/2016 | Bank et al. |
| 2016/0294956 A1 | 10/2016 | Fix et al. |
| 2017/0180276 A1* | 6/2017 | Gershony ............. H04L 51/222 |
| 2017/0180499 A1 | 6/2017 | Gelfenbeyn et al. |
| 2017/0323211 A1 | 11/2017 | Bencke et al. |
| 2017/0339178 A1 | 11/2017 | Mahaffey et al. |
| 2018/0025010 A1 | 1/2018 | Ramer et al. |
| 2018/0121808 A1 | 5/2018 | Ramakrishna et al. |
| 2018/0337871 A1 | 11/2018 | Matta et al. |
| 2018/0359179 A1 | 12/2018 | Zhang |
| 2019/0028588 A1 | 1/2019 | Shinseki et al. |
| 2019/0289025 A1 | 9/2019 | Kursun et al. |
| 2019/0379615 A1 | 12/2019 | Karp et al. |
| 2020/0143288 A1 | 5/2020 | Eisenzopf |
| 2020/0349614 A1 | 11/2020 | Batcha et al. |
| 2020/0349932 A1 | 11/2020 | Ogawa et al. |
| 2020/0356999 A1 | 11/2020 | Pandey et al. |
| 2021/0029246 A1 | 1/2021 | Erhart et al. |

* cited by examiner

SYSTEM AND METHOD FOR PROACTIVE INTERVENTION TO REDUCE HIGH COST CHANNEL USAGE

CROSS-REFERENCE TO RELATED APPLICATION INFORMATION

This is a continuation of U.S. patent application Ser. No. 16/868,717, filed May 7, 2020, which is a continuation of U.S. patent application Ser. No. 16/003,668, filed Jun. 8, 2018, now U.S. Pat. No. 10,680,979, issued Jun. 9, 2020, which are incorporated by reference in their entireties.

FIELD OF THE DISCLOSURE

The present disclosure generally relates to a method and system for generating an intervening message for a remote client device in response to an anticipated user action.

BACKGROUND

Automated systems for interacting with customers by generating automatic written, auditory, or video responses via web and mobile device application channels are useful ways to provide customers with requested information and perform routine account actions in an expedited, extended hours fashion, without the need to have a large workforce of customer service agents. While helpful, existing systems tend to provide a passive approach of waiting until a user reaches out to the system to address potential actions taken by the user.

SUMMARY

Embodiments disclosed herein generally relate to a system and method for proactively generating an intervening message for a remote client device in response to an anticipated user action. A computing system receives one or more streams of user activity. The one or more streams of user activity include interaction with a server of an organization via an application executing on the remote client device. The computing system inputs the one or more streams of user activity into a prediction model. The computing system identifies an anticipated user action based on a prediction output from the prediction model. The computing system determines, based on a solution model, a proposed solution to the anticipated user action. The computing system generates an anticipated message to be transmitted to the remote client device of the user. The anticipated message includes an indication of the proposed solution. The computing system transmits the anticipated message to the remote client device of the user.

In some embodiments, the prediction model is generated based on historical communications between the user and the organization via one or more communication channels.

In some embodiments, identifying the anticipated user action based on the prediction output from the prediction model includes the computing system identifying a most probable action to be taken by the user based on the one or more streams of user activity.

In some embodiments, transmitting the anticipated message to the remote client device of the user includes the computing system identifying a first communication channel by which the user most frequently communicated with the organization. The computing system identifies a second communication channel that is lower cost compared to the first communication channel. The computing system transmits the anticipated message to the remote client device of the user via the second communication channel.

In some embodiments, the prediction model is based on prior user activity with respect to the first communication channel.

In some embodiments, the prediction model is based on prior activity of additional users with respect to the first communication channel.

In some embodiments, the anticipated message is an email message that comprises one or more proposed actions to be taken.

In some embodiments, the anticipated message is a text message via an automated chatbot configured for engaging a dialogue with the user.

In some embodiments, the computing system further receives a message from the remote client device. The message includes a request to take further action. The computing system generates an event based on the request. The computing system executes the request.

In some embodiments, the message is received via a same communication channel as the anticipated message.

In another embodiment, a method of proactively generating an intervening message for a remote client device in response to an anticipated user action is disclosed herein. A computing system generates a prediction model configured to anticipate an inquiry from a user based on user behavior. The computing system receives one or more streams of user activity. The one or more streams of user activity include interaction with a server of an organization via an application executing on the remote client device. The computing system inputs the one or more streams of user activity into the prediction model. The computing system identifies an anticipated user action based on a prediction output from the prediction model. The computing system determines, based on a solution model, a proposed solution to the anticipated action. The computing system generates an anticipated message to be transmitted to the remote client device of the user. The anticipated message includes an indication of the proposed solution. The computing system transmits the anticipated message to the remote client device of the user.

In some embodiments, transmitting the anticipated message to the remote client device of the user includes the computing system identifying a communication channel by which the user most frequently communicated with the organization. The computing system identifies a further communication channel that is lower cost compared to the communication channel. The computing system transmits the anticipated message to the remote client device of the user via the further communication channel.

In some embodiments, the prediction model is based on prior user activity with respect to the first communication channel.

In some embodiments, the prediction model is based on prior user activity of additional users with respect to the first communication channel.

In some embodiments, identifying the anticipated user action based on the prediction output from the prediction model includes the computing system identifying a most probable action to be taken by the user based on the one or more streams of user activity.

In some embodiments, the computing system further receives a message from the remote client device. The message includes a request to take further action. The computing system generates an event based on the request. The computing system executes the request.

In some embodiments, the computing system further generates a confirmation message to be transmitted to the user. The computing system transmits the confirmation message to the remote client device.

In some embodiments, the message is received via a same communication channel as the anticipated message.

In another embodiment, a system is disclosed herein. The system includes a processor and a memory. The memory has programming instructions stored thereon, which, when executed by the processor, performs an operation. The operation includes receiving one or more streams of user activity. The one or more streams of user activity include interaction with a server of an organization via an application executing on the remote client device. The operation further includes identifying an anticipated user action based on a prediction output from a prediction model. The operation further includes determining, based on a solution model, a proposed solution to the anticipated user action. The operation further includes generating an anticipated message to be transmitted to the remote client device of the user. The anticipated message includes an indication of the proposed solution. The operation further includes transmitting the anticipated message to the remote client device of the user.

In some embodiments, the prediction model is generated based on historical communications between the user and the organization via one or more communication channels.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure generally relates to a method and system for generating an intervening message for a remote client device in response to an anticipated user action. One or more techniques disclosed herein relate to leveraging individualized user history (as well as history of other users) to train a prediction model, which may be used to anticipate future actions of the user based on current user activity. For example, through the prediction model, the present system may input one or more streams of user activity to anticipate a predicted action of the user. In a specific example, assume that a user has historically called a customer service number to confirm payment of a credit card account within five days of submitting an online payment. By recognizing the action of the user submitting payment, and determining, via the prediction model, that the user is likely to call a customer service number to confirm payment within five days, the disclosed system may anticipate the user's action, and transmit a payment confirmation message to the user within this time period.

In some embodiments, the present disclosure may also identify a communication channel in which a user is likely to use to communicate with an organization. For example, one or more techniques disclosed herein may parse the identified streams of user activity in accordance with the communication channel used to contact the organization. Such communication channels may include, for example, a live customer service channel, an artificial intelligence customer service channel, email correspondence, text message correspondence, and the like. To improve bandwidth on higher cost communication channels, such as a live customer service channel, the system described herein may encourage customers to use lower cost channels, by anticipating actions from the user that the user would historically carry out using a higher cost channel. By identifying those actions, the system may be able to address the customer's needs through a lower cost channel, depending on the complexity of the user's anticipated action.

The term "user" as used herein includes, for example, a person or entity that owns a computing device or wireless device; a person or entity that operates or utilizes a computing device; or a person or entity that is otherwise associated with a computing device or wireless device. It is contemplated that the term "user" is not intended to be limiting and may include various examples beyond those described.

Figure 1:
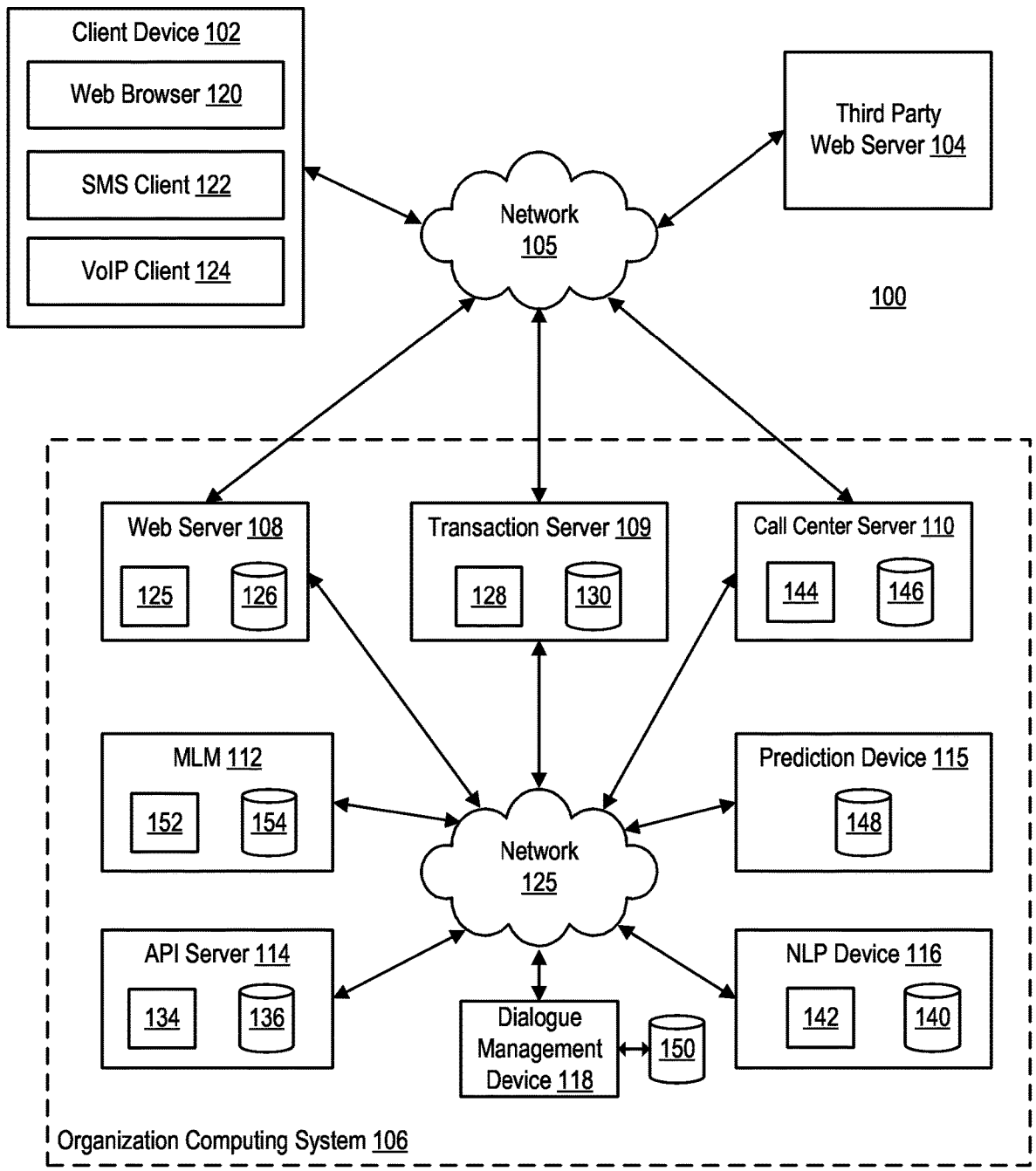
FIG. 1 is a block diagram illustrating a computing environment, according to one embodiment.

FIG. 1 is a block diagram illustrating a computing environment 100, according to one embodiment. Computing environment 100 may include a client device 102, a third party web server 104, and an organization computing system 106 communicating via network 105. Client device 102 may be operated by a user (or customer). For example, client device 102 may be a mobile device, a tablet, a desktop computer, or any computing system having the capabilities described herein. Client device 102 may belong to or be provided by a customer, or may be borrowed, rented, or shared. Customers may include individuals such as, for example, subscribers, clients, prospective clients, or customers of an entity associated with organization computing system 106, such as individuals who have obtained, will obtain, or may obtain a product, service, or consultation from an entity associated with organization computing system 106.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data. For example, network 105 may include any type of computer networking arrangement used to exchange information. For example, network 105 may be the Internet, a private data network, virtual private network using a public network and/or other suitable connection(s) that enables components in computing environment 100 to send and receiving information between the components of environment 100.

Third party web server 104 may include a computer system associated with an entity other than the entity associated with organization computing system 106 and customers that perform one or more functions associated with the organization computing system 106. For example, third party web server 104 may be directed to a server hosting an electronic mail (e-mail) web application or website.

Client device 102 may include at least an application 120, a short message service (SMS) client 122, and a voice over internet protocol (VoIP) client 122. Application 120 may be representative of a web browser that allows access to a website or a stand-alone application. User of client device 102 may access application 120 to access functionality of third party web server 104 (and/or web server 108). User operating client device 102 may communicate over network 105 to request a webpage, for example, from third party web server 104. For example, client device 102 may be configured to execute application 120 to access one or more functionalities managed by third party web server 104. The content that is displayed to user of client device 102 may be transmitted from third party web server 104 to client device 102, and subsequently processed by application 120 for display through a graphical user interface (GUI) of client device 102. SMS client 122 may be configured to provide text messaging functionality to client device 102. For example, user may access SMS client 122 to communicate with other client devices over network 105 via text message. VoIP client 124 may be configured to provide voice communications over IP networks (e.g., network 105).

Organization computing system 106 may be associated with or controlled by an entity, such as a business, corporation, individual partnership, or any other entity that provides one or more of goods, services, and consultations to individuals such as customers.

Organization computing system 106 may include one or more servers and computer systems for performing one or more functions associated with products and/or services provided by the organization associated with organization computing system 106. Organization computing system 106 may include a web server 108, a transaction server 109, a call center server 110, a machine learning module (MLM) 112, an application programming interface (API) server 114, a prediction device 115, a natural language processing (NLP) device 116, and a dialogue management device 118 communicating via local network 125.

Web server 108 may include a computer system configured to generate and provide one or more websites accessible to users or customers, as well as any other individuals involved in organization computer system's 106 normal operations. For example, web server 108 may include a computer system configured to receive communications from a client device 102 via a mobile application, a chat program, an instant messaging program, a voice-to-text program, an SMS message, email, or any other type or format of written or electronic communication. In particular, web server 108 may include a computer system configured to receive communications from a client device 102 via, for example, application 120, SMS client 122, or VoIP client 124, executing on client device 102.

Web server 108 may have one or more processors 125 and one or more web server databases 126, which may be any suitable repository of website data. Information stored in web server 108 may be accessed (e.g., retrieved, updated, and/or added to) via local network 125 by one or more components of organization computing system 106. In some embodiments, processor 125 may be used to implement an automated natural language dialogue system that may interact with a customer via different types of communication channels, such as a website, mobile application, instant messaging application, SMS message, email, or any other type of electronic communication. For example, while one or more components of organization computing system 106 monitors a user's activity via, for example, application 120, SMS client 122, or VoIP client 124, a respective component of organization computing system 106 (e.g., prediction device 115) may flag one or more actions performed by the customer and determine an anticipated user action from the flagged one or more actions.

Call center server 110 may include a computer system configured to receive, process, and route telephone calls and other electronic communications between a customer operation client device 102 and dialogue management device 118. Call center server 110 may include one or more processors 144 and one or more call center databases 146, which may be any suitable repository of call center data. Information stored in call center server 110 may be accessed (e.g., retrieved, updated, and/or added to) via local network 125 by one or more devices (e.g., dialogue management device 118) of organization computing system 106. In some embodiments, call center server processor 144 may be used to implement an interactive voice response (IVR) system that interacts with the customer over the phone.

Transaction server 109 may include a computer system configured to process one or more transactions involving an account associated with customers, or a request received from customers. In some embodiments, transactions may include, for example, a product/service purchase, a product/service return, financial transfer, financial deposit, financial withdrawal, financial credit, financial debit, dispute request, warranty coverage request, account balance request, and any other type of transaction associated with the products and/or services that an entity associated with organization computing system 106 provides to individuals, such as customers. Transaction server 109 may include one or more processors 128 and one or more transaction server databases 130, which may be any suitable repository of transaction data. Information stored in transaction server 109 may be accessed (e.g., retrieved, updated, added) via local network 125 by one or more devices of organization computing system 106.

Prediction device 115 may include one or more computer systems configured to receive one or more streams of customer (or user) activity while navigating the customer's account, and generate one or more proposed solutions to an anticipated user action based on the customer's previous history. Prediction device 115 may compile information from a plurality of sources, such as web server 108, call center server 110, and transaction server 109. Prediction device 115 may store customer activity in database 148. Prediction device 115 may include a prediction model that is used to generate the anticipated user action based on historical information associated with the user. Based on the anticipated user action, prediction device 115 may generate a proposed solution that addresses the anticipated user action.

Prediction device 115 may be used to make more readily available higher cost communication channels to customers with more complex questions or issues. In one example, prediction device 115 may be used to generate a pre-emptive notification to be sent to the customer in anticipation of the customer calling into the call center (i.e., using a higher cost channel). Prediction device 115 may, for example, identify that the customer has previously contacted the call center on numerous occasions to confirm that an online payment has cleared the customer's account. Prediction device 115 may identify the online payment as a "trigger event" for the customer to call into the call center. Prediction device 115 may also identify the context of the communication (e.g., checking whether the online payment cleared the customer's account). Based off the identified trigger and the context of the communication, prediction device 115 may generate a trigger rule that transmits a push-notification to a client device of the customer notifying the customer that the online payment has cleared the customer's account as soon as the online payment cleared the account. Such preemptive messaging by prediction device 115 steers the customer away from the higher cost channel, thereby freeing up resources for customers with more complex questions/issues.

In some embodiments, prediction model may also be based on historical information associated with other customers (or users) of organization computer system 106. In another example, prediction device 115 may be used to identify a trigger across multiple (e.g., all) users. In other words, prediction device 115 may generate a "global trigger rule" based off historical information associated with all customers of organization computer system 106. For example, prediction device 115 may identify that a plurality of customers typically call the call center to change their billing address following a transaction with a moving company. Prediction device 115 may identify the transaction with the moving company as a "trigger event" for the customer to call into the call center. Prediction device 115 may also identify the contexts of the communication (e.g., change the customer's billing address). Because prediction device 115 has recognized this pattern across a plurality of customers, prediction device 115 may generate a "global trigger rule" that transmits an email message to the customer with instructions on how to update customer's billing address, following a transaction with a moving company posted to the customer's account.

For example, a user of client device 102 may perform a set of actions via application 120. For this example, assume the set of actions performed via application 120 is the user of client device 102 paying a credit card bill electronically. Prediction device 115 may determine that the set of actions performed via application 120 is similar to past sets of actions performed by the user via application 120. Based on this history, prediction device 115 may identify an anticipated action performed by the user following this set of actions using the prediction module. For example, assume that following a credit card payment, the user almost always calls the financial organization within three days following the electronic payment to confirm that the payment was received. As such, the anticipated user action in the present scenario is the subsequent phone call from the user. Based on the identified anticipated user action, prediction device 115 may generate a proposed solution. Continuing with the example, prediction device 115 may generate a proposed solution that involves a pre-generated voicemail sent to client device 102 that confirms the user's payment. In another example, production device 115 may generate a proposed solution that involves a pre-generated text message sent to client device 102 that confirms the user's payment. In another example, production device 115 may generate an electronic message (i.e., email) that confirms the user's payment.

Machine learning module 112 may include one or more computer systems configured to train a prediction model used by prediction device 115. To train the prediction model, machine learning module 112 may receive, as input, one or more streams of user activity. The one or more streams of user activity may correspond to actions taken by the user with respect to the user's accounts with organization computing system 106. Such streams of activity may include payment of accounts, transferring of funds, navigation of web pages, calls to customer service, chat sessions with a bot, interactions with emails from organization computing system 106, and the like. In some embodiments, machine learning module 112 may further receiver, as input, one or more streams of activity associated with additional users. As such, machine learning module 112 may leverage both user specific and user agnostic information to identify both individualized patterns of activity and patterns of activity across all users. Machine learning module 112 may implement one or more machine learning algorithms to train the prediction model. For example, machine learning module 112 may use one or more of a decision tree learning model, association rule learning model, artificial neural network model, deep learning model, inductive logic programming model, support vector machine model, clustering mode, Bayesian network model, reinforcement learning model, representational learning model, similarity and metric learning model, rule based machine learning model, and the like. Machine learning module 112 may include one or more processors 152 and one or more machine learning model databases 154, which may be any suitable repository of transaction data. Information stored in machine learning module 112 may be accessed (e.g., retrieved, updated, added) via local network 125 by one or more devices of organization computing system 106.

Dialogue management device 118 may include one or more computer systems configured to receive and/or compile information from a plurality of sources, such as prediction device 115, web server 108, call center server 110, and transaction server 109, correlate received and/or compiled information, analyze the compiled information, arrange the compiled data, generate derived information based on the compiled information, and store the compiled and derived information in a database (e.g., database 150). According to some embodiments, database 150 may be a database associated with the organization of organization computing system 106 and/or its related entity that stores a variety of information relating to customers, transactions, and business operations. Database 150 may also serve as a back-up storage device and may contain data and information that is also stored on, for example, databases 126, 130, 136, 140, 146, 148, and 154. Database 150 may be accessed by dialogue management device 118. For example, database 150 may be used to store records of every interaction, communication, and/or transaction a particular costumer has with organization computing system 106 and/or its related entities. Such record storing aids in creating an ever-evolving customer context that allows dialogue management device 118 to provide customized and adaptive dialogue when interacting with the customer.

API server 114 may include a computer system configured to execute one or more APIs that provide various functionalities related to the operations of organization computing system 106. In some embodiments, API server 114 may include an API adapter that allows API server 114 to interface with and utilize enterprise APIs maintained by organization computing system 106 and/or an associated entity that may be housed on other systems or devices. In some embodiments, APIs may enable functions that include, for example, retrieving customer account information, modifying customer account information, executing a transaction related to an account, scheduling a payment, authenticating a customer, updating a customer account to opt-in or opt-out of notifications, and any other such function related to management of customer profiles and accounts. API server 114 may include one or more processors 134 and one or more API databases 136, which may be any suitable repository of API information. Information stored in API server 114 may be accessed via local network 125 by one or more components of organization computing system 106. In some embodiments, API processor 134 may be configured to access, modify, and retrieve customer account information.

Natural language processing (NLP) device 116 may include a computer system configured to receive and process incoming dialogue messages and determine a meaning of the incoming dialogue message. NLP device 116 may be configured to receive and execute a command that includes an incoming dialogue message where the command instructs NLP device 116 to determine the meaning of the incoming dialogue message. NLP device 116 may be configured to continuously monitor or intermittently listen for and receive commands from a command queue to determine if there are any new commands directed to NLP device 116. Upon receiving and processing an incoming dialogue message, NLP device 116 may output the meaning of an incoming dialogue message in a format that other devices can process.

In one example, the received dialogue message may be the result of a user providing additional information to organization computing system 106 as a result of being prompted by organization computing system 106. In this example, organization computing system 106 may receive a text message from the user, which may initiate a dialogue or be part of an ongoing dialogue with organization computing system 106. For example, organization computing system 106 may receive a dialogue message in response to a clarification question submitted by organization computing device. Dialogue management system 118 may place the dialogue message in a command queue, accessible by NLP device 116. NLP device 116 may identify that a new command is directed to NLP device 116, and may generate a response to the user's dialogue message. For example, NLP device 116 may generate a message to be transmitted to user, to invite the user to supply further information.

NLP device 116 may include one or more processors 142 and one or more NLP databases 140. Information stored in NLP device 116 may be accessed via local network 125 by one or more components of organization computing system 106. In some embodiments, NLP processor 142 may be used to implement an NLP system that may determine the meaning behind a string of text and convert it to a form that can be understood by other devices.

Local network 125 may comprise any type of computer networking arrangement used to exchange data in a localized area, such as Wi-Fi, Bluetooth™, Ethernet, and other suitable network connections that enable components of organization computing system 106 to interact with one another and to connect to network 125 for interacting with components in computing environment 100. In some embodiments, local network 125 may include an interface for communicating with or linking to network 105. In some embodiments, components of organization computing system 106 may communicate via network 105, without a separate local network 125.

Figure 2:
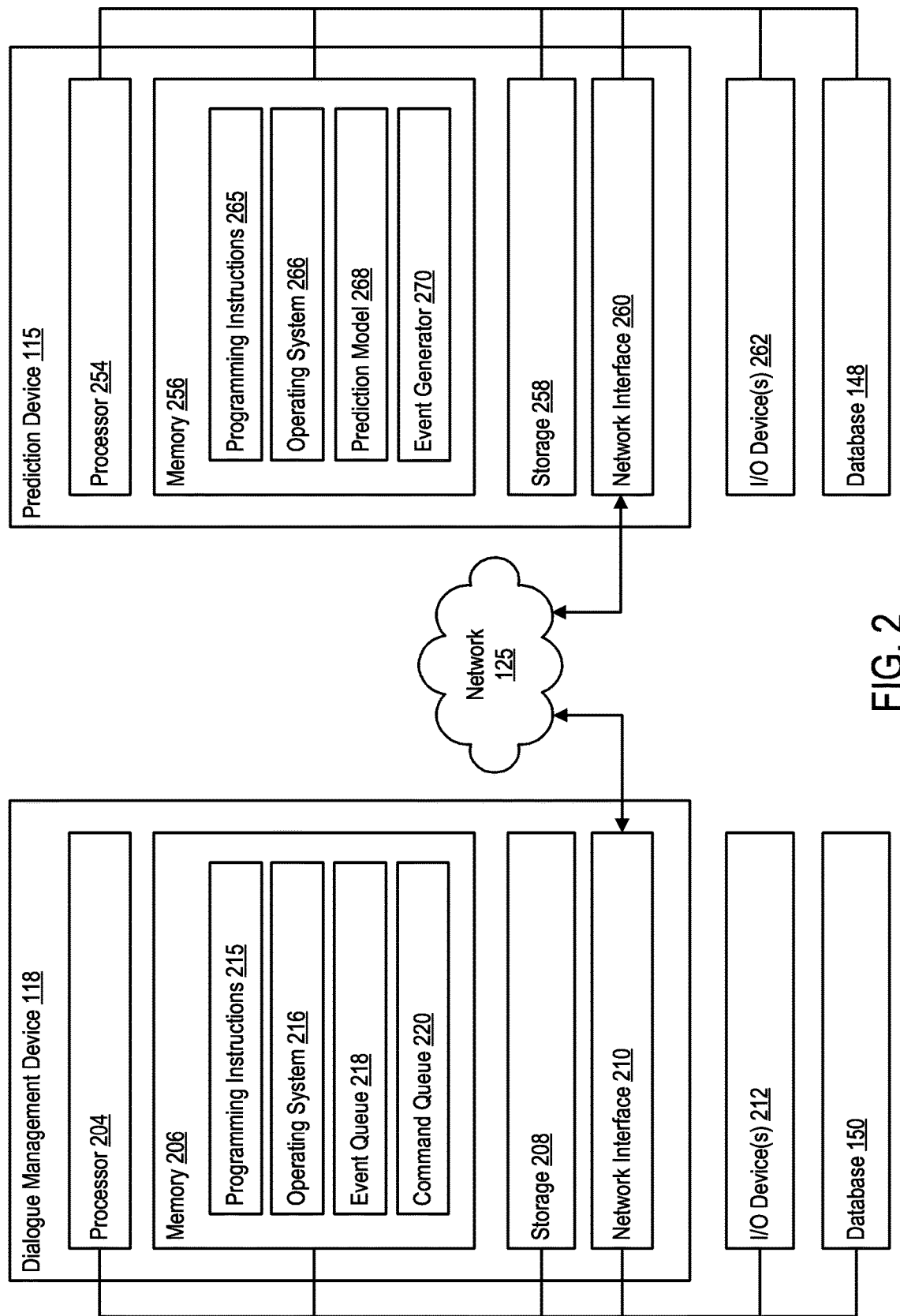
FIG. 2 is a block diagram illustrating a computing environment, according to one embodiment.

FIG. 2 is a block diagram illustrating a computing environment 200, according to an example embodiment. As illustrated, computing environment 200 may include at least dialogue management device 118 and prediction device 115 communicating via network 125.

Dialogue management device 118 may include a processor 204, a memory 206, a storage 208, and a network interface 210. In some embodiments, dialogue management device 118 may be coupled to one or more I/O device(s) 212.

In some embodiments, dialogue management device 118 may be in communication with database 150. Database 150 may store information to enable dialogue management device 118 to perform one or more of the processes and functionalities associated with the disclosed embodiments. Database 150 may include stored data relating to a customer profile and customer accounts, such as, for example, customer identification information (e.g., name, age, sex, birthday, address, VIP status, key customer status, preferences, preferred language, vehicle(s) owned, greeting name, channel, talking points, bank accounts, mortgage loan accounts, car loan accounts, account numbers, authorized users associated with one or more accounts, account balances, account payment information, and any other information that may be related to a user's account). Database 150 may store customer interaction data that includes records of previous customer service interactions with a customer via a website, SMS message, a chat program, a mobile application, an IVR system, or notations taken after speaking with a customer service agent. Database 150 may also include information about business transactions between organization computing system (or its related entities) and a customer that may be obtained from transaction server 109. Database 150 may also include customer feedback data, such as an indication of whether an automated interaction with a customer was successful, online surveys filled out by a customer, surveys answered by a customer following previous interaction to the company, digital feedback provided through websites or mobile application associated with the organization, and the like.

Processor 204 may include one or more of a microprocessor, microcontroller, digital processor, co-processor, or the like, or combinations thereof executing stored instructions and operating upon stored data. Processor 204 is included to be representative of a single processor, multiple processors, a single processor having multiple processing cores, and the like.

Network interface 210 may be any type of network communications enabling dialogue management device 118 to communicate externally via local network 125 and/or network 105. In one example, network interface 210 may allow dialogue management device 118 to communicate locally with one or more components of organization computing system 106. In one example, network interface 210 may allow dialogue management device 118 to communicate externally with client device 102.

Storage 208 may be, for example, a disk storage device. Although shown as a single unit, storage 208 may be a combination of fixed and/or removable storage devices, such as fixed disk drives, removable memory cards, optical storage, network attached storage (NAS), storage area network (SAN), and the like.

Memory 206 may be representative of any suitable memory device such as volatile or non-volatile memory, random access memory (RAM), read only memory (ROM), and the like. Memory 206 may include instructions that enable processor 204 to execute one or more applications, such as server applications, network communication processes, and the like. Memory 206 may include programming instructions 215, operating system 216, event queue 218, and command queue 220.

Event queue 218 may be configured to temporarily store queued events. Command queue 220 may be configured to temporarily store queued commands. Processor 204 may receive events from event queue 218, and in response to processing the event, generate one or more commands to be output to command queue 220. In some embodiments, dialogue management device 118 may place commands in command queue 220 in an order they are generated. Each command may be designated to be executed by one or more devices, such as, for example, web server 108, call center server 110, transaction server 109, API server 114, and/or NLP device 116. Each such device may continuously or intermittently monitor command queue 220 to detect one or more commands that are designated to be executed by the monitoring device, and may access pertinent commands. Event queue 218 may receive one or more events from other devices, such as, for example, prediction device 115, client device 102, web server 108, call center server 110, transaction server 109, API server 114, and/or NLP device 116.

While dialogue management device 118 has been described as one form for implementing one or more techniques described herein, those having ordinary skill in the art will appreciate that other, functionally equivalent techniques may be employed.

Prediction device 115 may include a processor 254, a memory 256, a storage 258, and a network interface 260. In some embodiments, prediction device 115 may be coupled to one or more I/O device(s) 262.

In some embodiments, prediction device 115 may be in communication with database 148. Database 148 may store information to enable prediction device 115 to perform one or more of the processes and functionalities associated with the disclosed embodiments. Database 148 may include stored data relating to a customer profile and customer accounts, such as, for example, customer identification information (e.g., name, age, sex, birthday, address, VIP status, key customer status, preferences, preferred language, vehicle(s) owned, greeting name, channel, talking points, bank accounts, mortgage loan accounts, car loan accounts, account numbers, authorized users associated with one or more accounts, account balances, account payment information, and any other information that may be related to a user's account). Database 148 may store customer interaction data that includes records of previous customer service interactions with a customer via a website, SMS message, a chat program, a mobile application, an IVR system, or notations taken after speaking with a customer service agent. Database 148 may also include historical information about user activity on web pages hosted by web server 108 of organization computing system 106. For example, database 148 may identify patterns in user behavior as the user navigates through websites of organization computing system 106.

Processor 254 may include one or more of a microprocessor, microcontroller, digital processor, co-processor, or the like, or combinations thereof executing stored instructions and operating upon stored data. Processor 254 is included to be representative of a single processor, multiple processors, a single processor having multiple processing cores, and the like.

Network interface 260 may be any type of network communications enabling prediction device 115 to communicate externally via local network 125 and/or network 105. In one example, network interface 260 may allow prediction device 115 to communicate locally with one or more components of organization computing system 106. In one example, network interface 260 may allow prediction device 115 to communicate with dialogue management device 118.

Storage 258 may be, for example, a disk storage device. Although shown as a single unit, storage 258 may be a combination of fixed and/or removable storage devices, such as fixed disk drives, removable memory cards, optical storage, network attached storage (NAS), storage area network (SAN), and the like.

Memory 256 may be representative of any suitable memory device such as volatile or non-volatile memory, random access memory (RAM), read only memory (ROM), and the like. Memory 256 may include instructions that enable processor 254 to execute one or more applications, such as server applications, network communication processes, and the like. Memory 256 may include programming instructions 265, operating system 266, prediction model 268, and event generator 270.

Programming instructions 265 may be accessed by processor 254 for processing (i.e., executing programming instructions). Programming instructions 265 may include, for example, executable instructions for communicating with dialogue management device 118. For example, programming instructions 265 may include executable instructions configured to perform steps discussed below in conjunction with FIGS. 4, 6, and 7.

Prediction model 268 may be accessed by processor 254 for generating an anticipated user action based on one or more current actions taken by the user. For example, processor 254 may input one or more streams of user activity into prediction model 268, such that prediction model 268 may determine an anticipated user action based on the output from prediction model 268. Prediction model 268 may be trained using machine learning module 112. For example, machine learning module 112 may train prediction model 268 using one or more streams of historical user activity. The one or more streams of historical user activity may correspond to actions taken by the user with respect to the user's accounts. For example, machine learning module may input one or more streams of historical user data according to a communication channel in which the user corresponded with organization computing system 106. In some embodiments, prediction model 268 may further be trained with one or more streams of historical activity of additional users of organization computing system 106.

Prediction model 268 may be used to generate one or more "trigger events" both on an individualized, customer basis, as well as a global basis (i.e., across all customers). For example, prediction model 268 may receive on or more streams of customer activity. Based on the one or more streams of customer activity, prediction model 268 may determine that the customer typically calls into the call center five days before an account payment is due to make the payment over the phone. Prediction model 268 may identify the fifth day from the payment due date as a "trigger event" for the customer. Prediction model 268 may also identify the account payment as context of the communication. Based off the identified trigger event and the context, prediction model 268 may output a trigger rule that transmits an email to the customer, with a link to an online payment page.

Prediction model 268 may generate a trigger rule on a global basis based off of identified patterns in the activity of a plurality of customers. For example, upon identifying that customers, who typically make account payment over the phone, tend to wait until the last possible day to pay their account balance, prediction model 268 may generate a trigger rule in which the user receives a call from an artificial-intelligence based customer service channel, reminding the customer of the payment, as well as prompting the user to submit a payment at this time.

Event generator 270 may be configured to generate an event corresponding to the anticipated user action that was determined by prediction model 268. In other words, event generator 270 may be configured to generate a proposed solution to the anticipated user action and, subsequently, event generator 270 may add the proposed solution to event queue 218 for further processing by dialogue management device 118. For example, assuming prediction model 268 determines, based on the one or more streams of user activity, that the user is likely to call a representative of organization computing system 106 to verify that a prior credit card payment was received and credited, event generator 270 may generate a proposed solution of sending the user a text message including confirmation of the payment. Event generator 270 may add this proposed solution to event queue 218 as an event to be processed by dialogue management device 118 and other components of organization computing system 106.

While prediction device 115 has been described as one form for implementing one or more techniques described herein, those having ordinary skill in the art will appreciate that other, functionally equivalent techniques may be employed.

Figure 3:
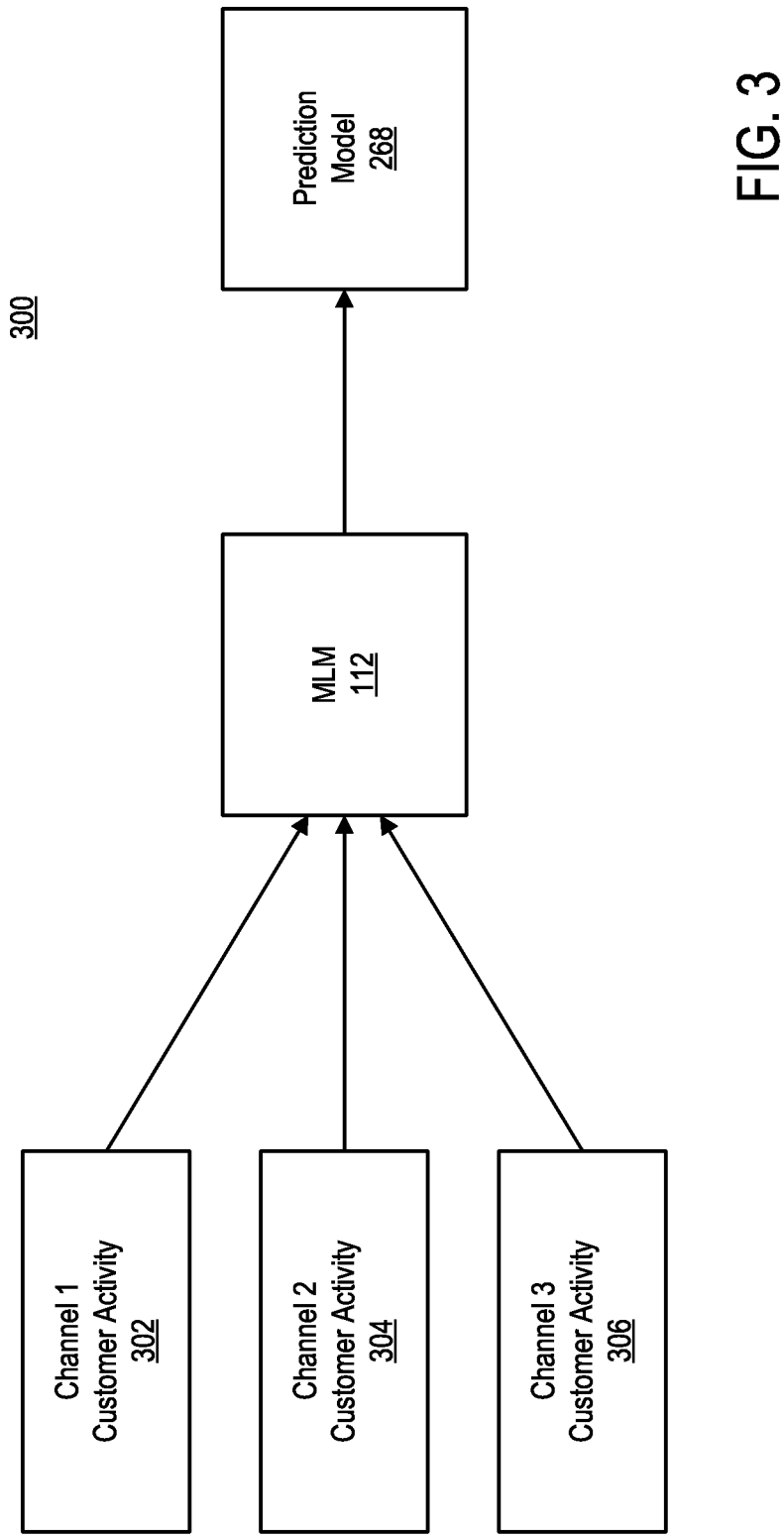
FIG. 3 is a block diagram illustrating one or more communication channels, according to one embodiment.

FIG. 3 is a block diagram 300 illustrating one or more communication channels between client device 102 and organization computing system 106, according to one embodiment. As illustrated, one or more communication channels may include channel 1 customer activity 302, channel 2 customer activity 304, and channel 3 customer activity 306. Channel 1 customer activity 302 may correspond to customer activity via telecommunication means (i.e., the customer calling a live customer service channel associated with organization computing system 106).

Generally, Channel 1 communication may be a considered a "higher cost" communication channel compared to Channel 2 communication and Channel 3 communication. Higher cost may refer to a relatively higher outlay on personnel and other related call center resources. For some enterprises, Channel 1 communication may be encouraged for complex issues, higher demand, higher sensitive means of communication between client device 102 and organization computing system 106. As such, limiting the traffic of Channel 1 communication aids in increasing the bandwidth between client device 102 and organization computing system 106 for those more critical customer issues.

Channel 2 and Channel 3 communications may be considered lower costs compared to Channel 1 communications. Channel 2 customer activity 304 may correspond to customer activity via automated telecommunication means (i.e., the customer calling an artificial-intelligence based customer service channel). Channel 3 customer activity 306 may correspond to customer activity via a computer network (i.e., via text messaging, electronic messages (email), and the like).

Each of Channel 1 customer activity 302, Channel 2 customer activity 304, and Channel 3 customer activity 306 may be inputted into machine learning module 112 to train predictive model 268. In particular, machine learning module 112 may be provided with a training set of historical user activity that is categorized on a communication channel basis. As such, machine learning module 112 may not only train prediction model 268 to determine an anticipated user action, but to also identify the communication in which the user is most likely to use, and determine whether a lower cost channel may be used to address the anticipated user action.

Once predictive model 268 is trained, live customer activity may be input directly into prediction model 268.

Figure 4:
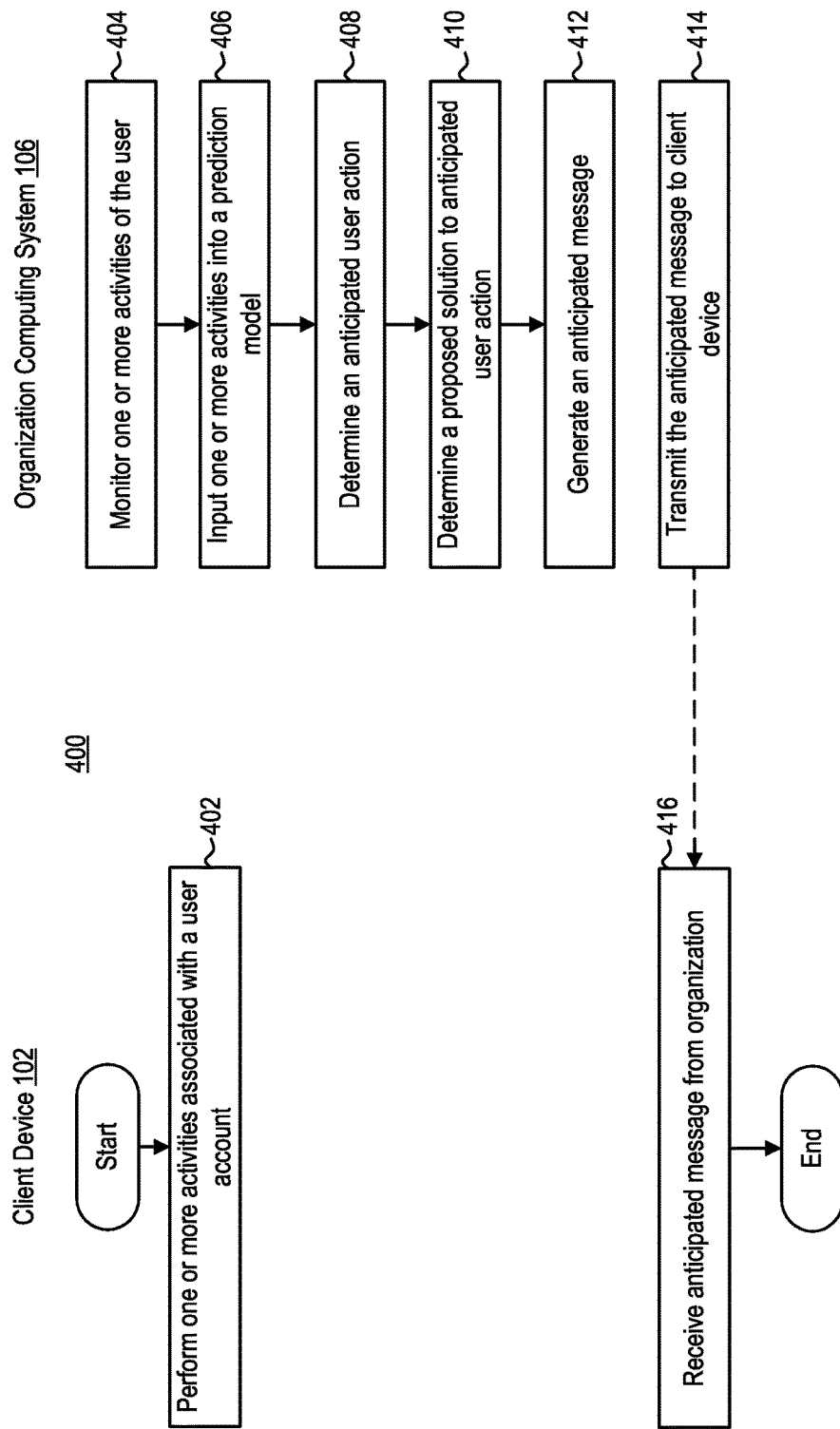
FIG. 4 is a flow diagram illustrating a method of generating an intervening message for a remote client device in response to an anticipated user action, according to one embodiment.

FIG. 4 is a flow diagram illustrating an exemplary method 400 of generating an intervening message for a remote client device in response to an anticipated user action, according to one embodiment. Method 400 begins at step 402. At step 402, user may perform one or more activities associated with a user account on client device 102. For example, user may navigate one or more web pages associated with the user's account. In some embodiments, one or more activities may correspond to one or more of payment of an account, transferring of funds, navigation to a customer service chatbot, a search of previous transactions, a line of credit application, a loan application, a change of personal identification information, and the like.

At step 404, organization computing system 106 may monitor one or more activities of the user. For example, prediction device 115 may monitor one or more streams of user activity. In some embodiments, prediction device 115 may monitor one or more streams of user activity while the user is accessing the user's account. In some embodiments, prediction device 115 may monitor one or more streams of user activity while the user is accessing a web page hosted by web server 108. In some embodiments, prediction device 115 may monitor one or more streams of user activity while the user is navigating web pages associated with one or more third party servers 104.

At step 406, organization computing system 106 may input the one or more streams of user activity into prediction model 268. For example, prediction device 115 may input the one or more streams of user activity into prediction model 268 to generate an anticipated user action.

At step 408, organization computing system 106 may determine an anticipated user action based on the one or more streams of user activity. For example, after receiving the one or more streams of user activity as input, prediction model 268 may generate an output. Based on the output, prediction device 115 may determine an anticipated user action. In some embodiments, prediction device 115 may determine one or more anticipated user actions. Prediction device 115 may select a given anticipated user action by determining the anticipated user action that is most probable. In some embodiments, prediction device 115 may further determine the communication channel in which the anticipated user action will occur. For example, based on output from prediction model 268, prediction device 115 may determine that user is likely to contact organization computing system 106 via a live operator (e.g., Channel 1 communication).

At step 410, organization computing system 106 may determine a proposed solution based on the determined anticipated user action. For example, prediction device 115 may determine the proposed course of action to take based on what the prediction device 115 predicted the user's next action may be. In some embodiments, the proposed solution may take into account the complexity of the anticipated user action. For example, in those situations where the anticipated user action is relatively complex (e.g., transferring large sums of money, applying for a mortgage, etc.), prediction device 115 may determine that the proposed course of action is to reach out to the user via a live operator (e.g., Channel 1 communication). In another example, such as those situations where the anticipated user action is not relatively complex (e.g., calling a live operator to confirm a payment cleared), prediction device 115 may determine that the proposed solution is to anticipate the user's call, and use a lower cost channel (e.g., text message notification) to notify the user of payment confirmation.

At step 412, organization computing system 106 may generate an anticipated message to be transmitted to client device 102. For example, dialogue management system 118 may work in conjunction with one or more components of organization computing system 106 and a communications interface (illustrated in FIGS. 5A and 5B) to generate a message that includes an indication of the proposed solution.

At step 414, organization computing system 106 may transmit the anticipated message to client device 102. For example, organization computing system 106 may transmit the anticipated message to client device 102 via a communication channel determined above, in conjunction with step 410.

At step 416, client device 102 may receive the anticipated message from organization computing system 106. In some embodiments, in which the anticipated message is transmitted via a Channel 1 communication channel, client device 102 may receive a phone call from a live operator. In some embodiments, in which the anticipated message is transmitted via a Channel 2 communication channel, client device 102 may receive a phone call from an AI-based customer service channel. In some embodiments, in which the anticipated message is transmitted via a Channel 3 communication channel, client device 102 may receive the anticipated message via email via application 120, text message via SMS agent 122, push notification via application 120, and the like.

In some embodiments, the anticipated message may be received via SMS agent 122 from an interactive chatbot. The interactive chatbot may establish a persistent session to communicate customer specific information with client device 102. Additionally, interactive chatbot may engage in dialogue with user (or customer) of client device 102, such that the chatbot can respond to any follow-up questions the customer may have. For example, a user or customer may be enrolled or pre-registered (or otherwise configured) to communicate with an assistant (live or automated) via an SMS channel, as similarly described in U.S. patent application Ser. No. 15/916,521 filed Mar. 9, 2018, titled "Systems and Methods for Controlling Enrollment and Secure Persistent SMS Texting Account Servicing with an Intelligent Assistant," the entirety of the contents of which are expressly incorporated herein.

In some embodiments, a chat session may be initiated with the customer via an email from organization computing system 106 to client device 102. For example, a user or customer may receive the anticipated message via an email that includes one or more predefined hyperlinks that are actionable by the user, as similarly described in U.S. patent application Ser. No. 15/987,157 filed May 23, 2018, titled "Method and System of Converting Email Message to AI Chat," the entirety of the contents of which are expressly incorporated herein. Selection of one or more hyperlinks may initiate a dialogue with a virtual assistant via an SMS channel. In some embodiments, where the user or customer may not yet have consented to communicate with text or may not otherwise be enrolled or registered to communication with an assistant via an SMS channel, the email transmitted to user with the one or more hyperlinks included therein includes a request, consent or authorization to enable the organization to contact or interact with the user via text message. For example, the email transmitted to the user may include a statement that selecting one of the hyperlinks corresponds to the user implicitly granting organization computing system 106 authorization to contact user via text message.

In some embodiments, organization computing system 106 may initiate a web based chat using dialogue management device 118. For example, organization computing system 106 may detect that a user is on a web site hosted by web server 108. Based on this determination, dialogue management device 118 may initiate an interactive chat session with the customer while the customer is browsing the web site. In another example, organization computing system 106 may make available for download a browser extension. When customer adds the browser extension to a browser (e.g., application 120), dialogue management device 118 may initiate an interactive chat session with the customer while the customer is online. In this example, the customer need not be navigating a web site hosted by web server 108.

Figure 5A:
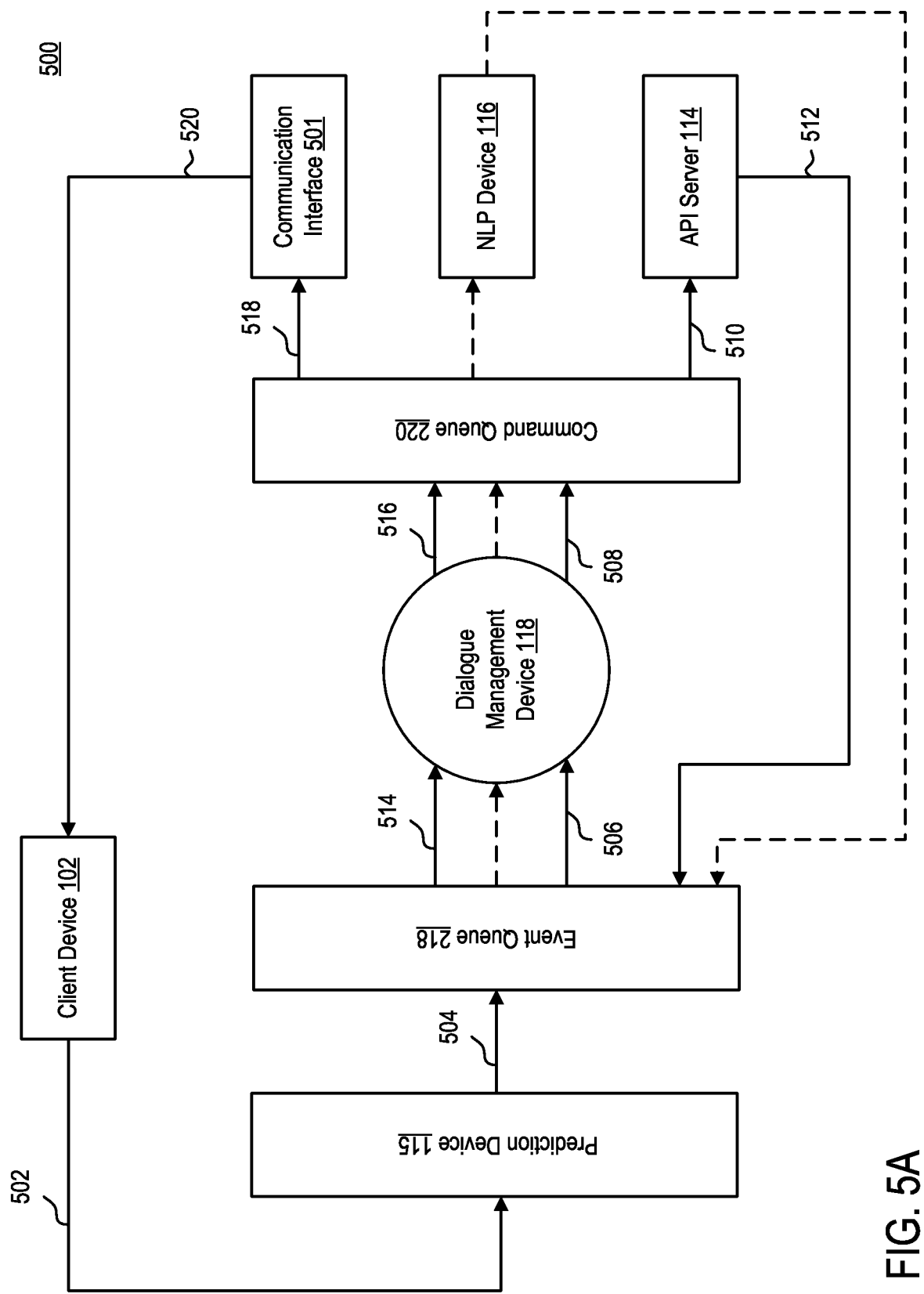
FIG. 5A is a block diagram illustrating interaction of one or more components of a computing environment, according to one embodiment.
Figure 6:
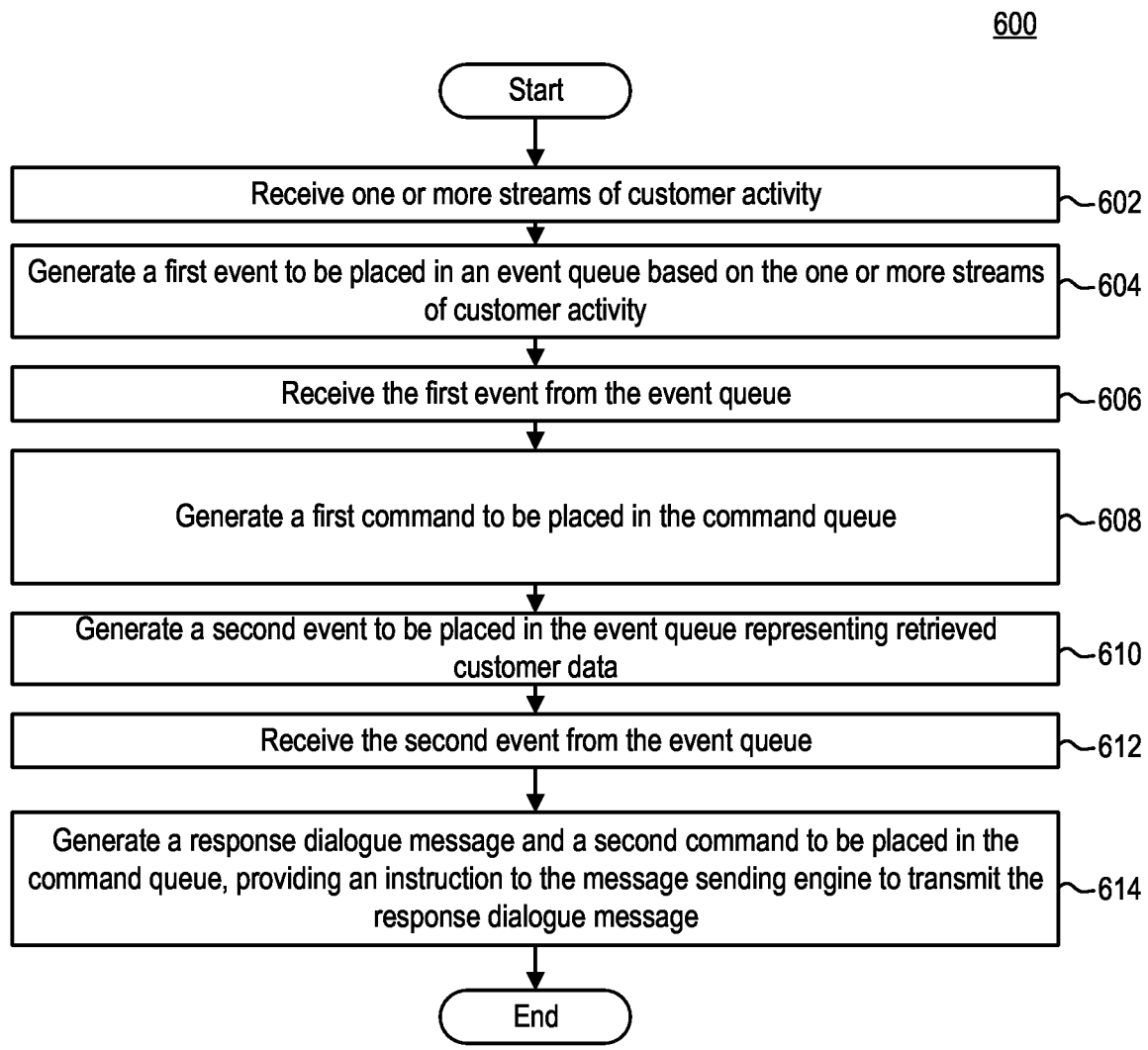
FIG. 6 is a flow diagram illustrating a method of generating an intervening message for a remote client device in response to an anticipated user action, according to one embodiment.

FIG. 5A is a block diagram illustrating an exemplary system functionality diagram 500 for a system generating an intervening message for a remote client device in response to an anticipated user action, according to one embodiment. The functionality illustrated in FIG. 5A may be executed by one or more components of computing system 100. FIG. 6 is a flow diagram illustrating a method 600 for generating an intervening message for a remote client device in response to an anticipated user action, according to one embodiment. The one or more steps discussed in conjunction with FIG. 6 may correspond to the system functionality diagram 500 illustrated in FIG. 5A.

As illustrated in FIG. 5A, prediction device 115 may receive one or more streams of user activity from client device 102 at block 502 (e.g., block 602 of FIG. 6). In some embodiments, prediction device 115 may monitor one or more streams of user activity while the user is accessing the user's account. In some embodiments, prediction device 115 may monitor one or more streams of user activity while the user is accessing a web page hosted by web server 108. In some embodiments, prediction device 115 may monitor one or more streams of user activity while the user is navigating web pages associated with one or more third party servers 104.

As shown in FIGS. 5A and 6, at blocks 504 and 604, organization computing system 106 may generate a first event to be placed in event queue 218. For example, prediction device 115 may generate a first event by inputting the one or more streams of user activity into prediction model 268 to determine an anticipated user action based on the user activity. Based on output from prediction model 268, prediction device 115 may anticipate a user action. Additionally, prediction device 115 may specify the communication channel in which the anticipated user action is most likely to occur. For example, prediction device 115 may determine that the user is likely to call a live customer service representative around mid-month to determine when a credit card payment is due. Accordingly, prediction device 115 determines that anticipated user action (e.g., seeking credit card payment date mid-month) and the communication channel in which the user performs the action (e.g., telephone call to live customer service representative).

From the anticipated user action, prediction device 115 may further determine a proposed solution. For example, prediction device 115 may determine the proposed course of action to take based on what the prediction device 115 predicted the user's next action is likely to be. In some embodiments, the proposed solution may take into account the complexity of the anticipated user action. Using the proposed solution, prediction device 115 may generate a first event to be placed in event queue 218. Continuing with the above example, the event to be placed in event queue may be "contact user via lower cost channel to notify user of credit card payment date on the $14^{th}$ of every month"). The event may further include user-specific information, such that dialogue management device 118 may readily identify the user and the user's accounts in subsequent processing. As such, prediction device 115 may inject a user identifier in the event that corresponds to the user. Such user identifier may be, for example, a unique set of characters corresponding to the user. After the first event is created, prediction device 115 may place the first event in event queue 218. For example, event queue 218 may be configured to temporarily store one or more events for subsequent processing by dialogue management device 118.

As illustrated above in conjunction with FIG. 2, event queue 218 and command queue 220 may be one or more components of dialogue management device 118. In some embodiments, both event queue 218 and command queue 220 may be one or more components of a device other than dialogue management device 118. For example, those skilled in the art will appreciate that event queue 218 and command queue 220 may be one or more components maintained on a cloud server, accessible by, for example, dialogue management device 118.

In some embodiments, dialogue management device 118 may continuously (or intermittently) monitor event queue 218 for events posted therein. At blocks 506 (FIG. 5A) and 606 (FIG. 6), in response to detecting an event (e.g., the first event) in event queue 218, dialogue management device 118 may receive the event from event queue 218. In some embodiments, the user context may be derived using the user identifier included in the first event. For example, dialogue management device 118 may associate the user identifier with a given user and their user information that is stored in database 150. In some embodiments, the user information may include one or more of account types, account statuses, transaction history, conversation history, people models, an estimate of user sentiment, user goals, user social media information, and the like. The user context may allow organization computing system 106 to adapt and tailor its responses to a particular customer based on the identified user context. In some embodiments, the user context may be updated each time dialogue management device 118 receives a new event from event queue 218.

At blocks 508 (FIG. 5A) and 608 (FIG. 6), dialogue management device 118 may generate a first command to be placed in command queue 220. In some embodiments, dialogue management device 118 may generate a command based on the processed event, the customer context, and the proposed solution. In some embodiments, upon generating a command, dialogue management device 118 may identify a component that may subsequently execute the command. For example, dialogue management device 118 may determine whether one or more of API server 114, NLP device 116, or communication interface 501 may subsequently execute the command.

At blocks 510, 512 (FIG. 5A) and 610 (FIG. 6), API server 114 may receive the first command from command queue 220, execute the first command, and generate a second event to be placed in event queue 218. In some embodiments, API server 114 may continuously or intermittently monitor command queue 220 to detect new commands. Upon receiving a command, API server 114 may perform one or more functions associated with the command. For example, based on the proposed solution contained in the command, API server 114 may call up an API stored locally or remotely on another device to retrieve user account information (e.g., retrieve account balance, retrieve payment date, etc.), perform an account action (e.g., make a payment on a customer account), authenticate a customer (e.g., verify customer credentials), and the like. Accordingly, in some embodiments, the second event may represent a retrieved account balance, an acknowledgement of the performance of an account action, etc. Generally, the second event may correspond to organization computing system 106 carrying out an anticipated inquiry (or request) from the user.

At blocks 514 (FIG. 5A) and 612 (FIG. 6), dialogue management device 118 may receive the second event from event queue 218 in response to detecting the second event placed therein. At blocks 516 (FIG. 5A) and 614 (FIG. 6), dialogue management device 118 may, in response to processing the second event, generate a second command to be placed in command queue 220. In some embodiments, dialogue management device 118 may generate the second command based on the processed second event and the user context.

At blocks 518 and 520, communication interface 501 may receive and execute the second command, which may cause communication interface 501 to transmit an anticipated message to client device 102 from organization computing system 106. For example, executing the second command may cause communication interface to transmit (via text message) a response dialogue to client device 102 that provides an indication of the proposed solution. Continuing with the above example, the indication may be the date upon which the user's credit card payment is due. Still further, the message is transmitted to client device 102 via a lower cost communication channel (e.g., text message) compared to the user's traditional methods of contacting organization (e.g., live telephone operator).

In another example, in response to anticipating the user making a payment to pay off the entire credit card balance (based on the user's history), the indication may be a question to the user comprising: "Would you like to make a payment of [entire balance] today?"

In some embodiments, communication interface 501 may continuously or intermittently monitor command queue 220 for new commands, and may receive the second command in response to detecting the second command posted to event queue 220. In some embodiments, communication interface 501 may be a standalone component having some or all elements of dialogue management device 118, as illustrated in FIG. 2. In some embodiments, communication interface 501 may be integrated into dialogue management device 118 (e.g., as an I/O device 212). In some embodiments, communication interface 501 may be integrated into another component of organization computing system 106, such as, for example, web server 108, call center server 110, transaction server 109, API server 114, prediction device 115, or NLP server 116.

Figure 5B:
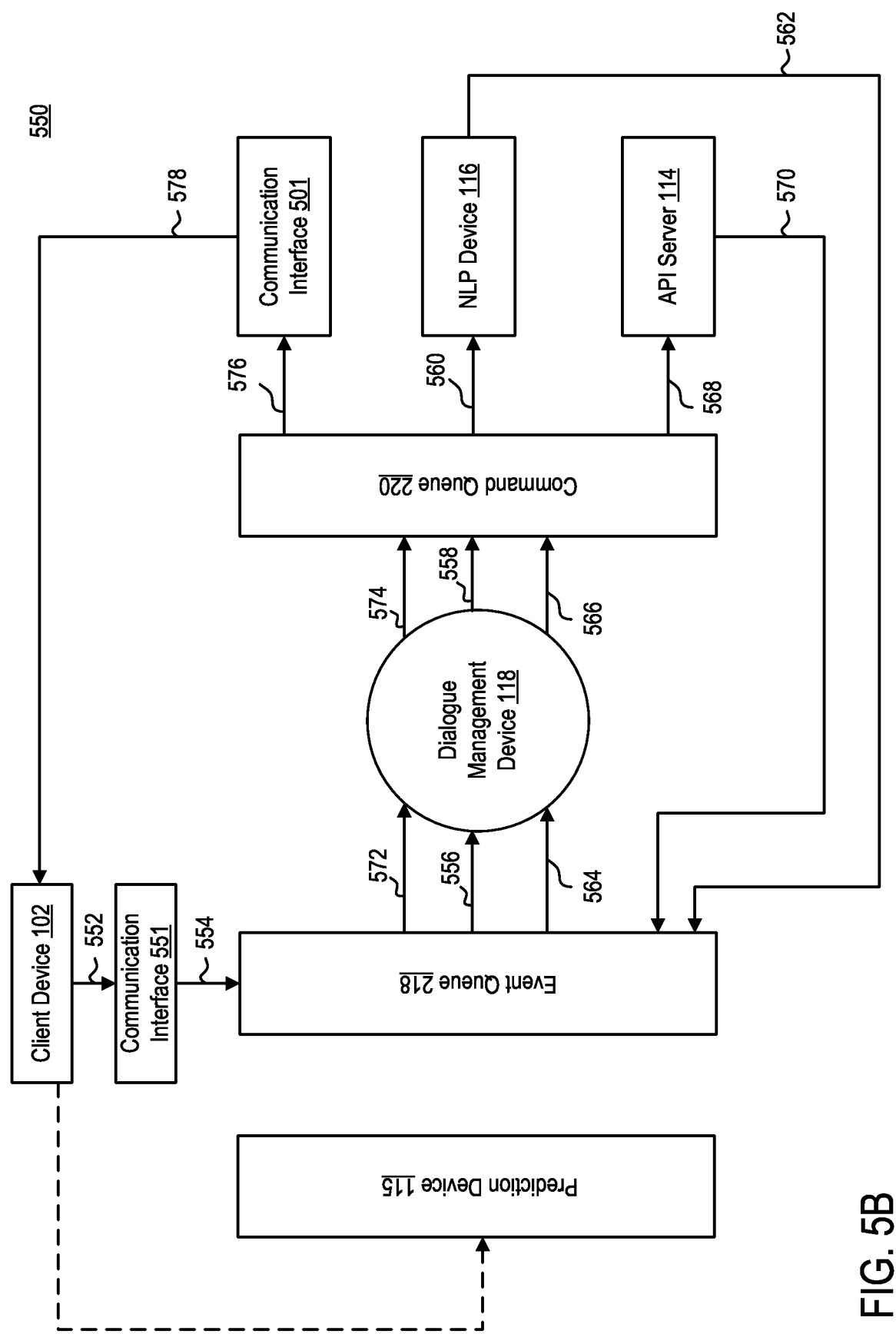
FIG. 5B is a block diagram illustrating interaction of one or more components of a computing environment, according to one embodiment.
Figure 7:
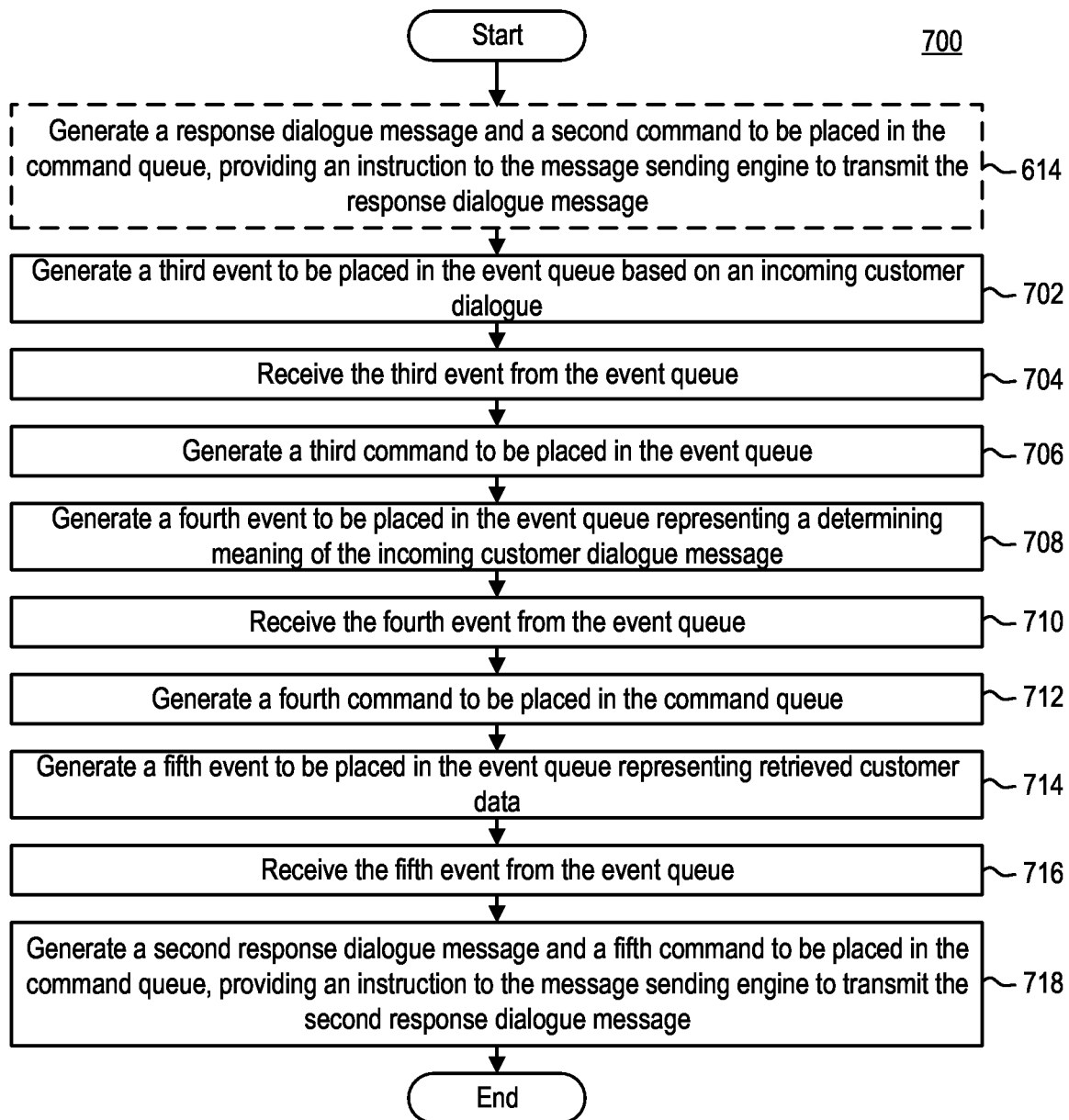
FIG. 7 is a flow diagram illustrating a method of generating an intervening message for a remote client device in response to an anticipated user action, according to one embodiment.

FIG. 5B is a block diagram illustrating an exemplary system functionality diagram 550 for a system generating an intervening message for a remote client device in response to an anticipated user action, according to one embodiment. The functionality illustrated in FIG. 5B may be executed by one or more components of computing system 100. FIG. 7 is a flow diagram illustrating a method 700 for generating an intervening message for a remote client device in response to an anticipated user action, according to one embodiment. The one or more steps discussed in conjunction with FIG. 7 may correspond to the system functionality diagram 550 illustrated in FIG. 5B.

Method 700 may begin upon receiving a further prompt from client device 102. Referring back to step 614 of FIG. 6, organization computing system 106 may generate and send a message to client device 102 seeking further input from the user. Continuing with a previous example, upon determining that an anticipated user action is to pay the entire balance of an account, organization computing system 106 may transmit a message to client device 102 with an indication of a proposed solution—"Would you like us to pay the balance [$XX.XX] on your credit card statement?"

At block 552, communication interface 551 may receive an incoming dialogue message from client device 102. Incoming dialogue message may be received in response to the user receiving the anticipated message with an indication of the proposed solution. In response, user may generate a dialogue message that is transmitted from client device 102 to organization computing system 106. In some embodiments, the incoming dialogue message from client device 102 may be transmitted via a same communication channel as the outgoing anticipated message. For example, the anticipated message was transmitted to client device 102 via text message; similarly, the incoming dialogue message was received from client device 102 via text message. In some embodiments, the incoming dialogue message from client device 102 may be transmitted via a different communication channel. For example, the anticipated message was transmitted to client device 102 via email; the incoming dialogue message was received from client device 102 via text message.

At blocks 554 (FIG. 5B), and 702 (FIG. 7), organization computing system 106 may generate a third event to be placed in event queue 218 in response to receiving a customer dialogue message. In some embodiments, the customer dialogue message may be sent directly from client device 102 to event queue 218. In some embodiments, the customer dialogue message may be transmitted to dialogue management device 118, and subsequently transmitted from dialogue management device 118 to event queue 218. The customer dialogue message may include information associated with the anticipated message transmitted from communication interface 501 to client device 102.

In some embodiments, dialogue management device 118 may continuously or intermittently monitor event queue 218. At blocks 556 (FIG. 5B) and 704 (FIG. 7) in response to detecting an event (e.g., the third event) in event queue 218, the event may be received at dialogue management device 118. At blocks 558 (FIG. 5B) and 706 (FIG. 7), dialogue management device 118 may, in response to processing the third event, generate a third command to be placed in command queue 220. In some embodiments, dialogue management device 118 may generate the command based on the processed event, the message received from the client device 102, and customer context. In some embodiments, when dialogue management device 118 generates a command, such as the third command, dialogue management device 118 may determine an entity that will execute the command. For example, in the embodiment discussed in conjunction with FIGS. 5B and 7, dialogue management device 118 may determine that the third command is to be executed by NLP device 116 in order to determine the meaning of incoming customer dialogue message.

At blocks 560 (FIG. 5B) and 708 (FIG. 7), NLP device 116 may receive the third command from command queue 220. According to some embodiments, NLP device 116 may continuously or intermittently monitor command queue 220 to detect new commands and, upon detecting a new command, may receive the command from command queue 220. Upon receiving a command, NLP device 116 may perform various functions, depending on the nature of the command. For example, in some embodiments, NLP device 116 may determine the meaning of an incoming dialogue message by utilizing one or more artificial intelligence techniques. Such artificial intelligence techniques may include, but are not limited to, intent classification, named entity recognition, sentiment analysis, relation extraction, semantic role labeling, question analysis, rules extraction and discovery, and story understanding.

In some embodiments, NLP device 116 may perform natural language generation in response to receiving a command. In some embodiments, NLP device 116 may perform natural language processing by utilizing one or more artificial intelligence techniques. Such artificial intelligence techniques may include, but are not limited to, content determination, discourse structuring, referring expression generation, lexicalization, linguistic realization, explanation generation. In the exemplary embodiment discussed in conjunction with FIGS. 5B and 7, NLP device 116 may determine the meaning of the incoming customer dialogue message and convert it to a form that may be processed by dialogue management device 118. Accordingly, dialogue management device 118 may generate a fourth event that represents a determined meaning of the incoming customer dialogue message. NLP device 124 may transmit the fourth event to event queue 218 (562 of FIG. 5B; 708 of FIG. 7).

At blocks 564 (FIG. 5B) and 710 (FIG. 7), dialogue management device 118 may receive the fourth event from event queue 218, in response to detecting the fourth event, according to one or more operations described above. At blocks 566 (FIG. 5B) and 712 (FIG. 7), dialogue management device 118 may, in response to processing the fourth event, generate a fourth command to be placed in command queue 220. According to some embodiments, dialogue management device 120 may generate the fourth command based at least on the processed event and customer context. For example, the fourth event may represent the user's dialogue message in response to the clarification message. Accordingly the third event may read: "Pay entire balance of the account."

At blocks 568 (FIG. 5B) and 714 (FIG. 7), API server 114 may receive the fourth command from command queue 220, execute the command, and generate a fifth event to be placed in event queue 218 (570 of FIG. 5B). According to some embodiments, API server 114 may continuously or intermittently monitor command queue 220 to detect new commands. Upon detecting a new command in command queue 220, API server 114 may receive the command from command queue 220. Upon receiving a command, API server 114 may perform various functions, depending on the nature of the command. For example, in some embodiments, API server 114 may call up an API stored locally or remotely on another device, to retrieve customer information (e.g., retrieve an account balance), perform an account action, or execute an opt-in/opt-out command. Accordingly, continuing with the above example, the fourth event may include the paying the entire balance of the user's account.

At blocks 572 (FIG. 5B) and 716 (FIG. 7), dialogue management device 118 may receive the fifth event from event queue 218 in response to detecting the fifth event, according to one or more operations discussed above. At blocks 574 (FIG. 5B) and 718 (FIG. 7), dialogue management device 118 may, in response to processing the fifth event, generate a fifth command to be placed in command queue 220. According to some embodiments, dialogue management device 118 may generate the fifth command based on at least the processed fifth event and the customer context. In some embodiments, dialogue management device 118 may also generate a response dialogue message in response to processing the fifth event. In some embodiments, dialogue management device 118 may receive a response dialogue message (e.g., confirmation of payment) as an event produced by NLP device 116. In some embodiments, the fifth command may represent a command or instructions to communication interface 501 to transmit the response dialogue message to client device 102.

At blocks 576 (FIG. 5B) and 578 (FIG. 5B), communication interface 501 may receive and execute the fifth command, which may cause communication interface 501 to continue to transmit response dialogue message to client device 102. For example, executing the fifth command may cause communication interface 501 to transmit (via text message) a response dialogue to client device 102. In some embodiments, communication interface 501 may continuously or intermittently monitor command queue 220 for new commands, and may receive the fifth command in response to detecting the fifth command posted to event queue 220. The response dialogue may include the response to the user's clarification. For example, in response to the confirmation to pay the entire balance of the account, the response dialogue message may include a confirmation of the payment.

Figure 8:
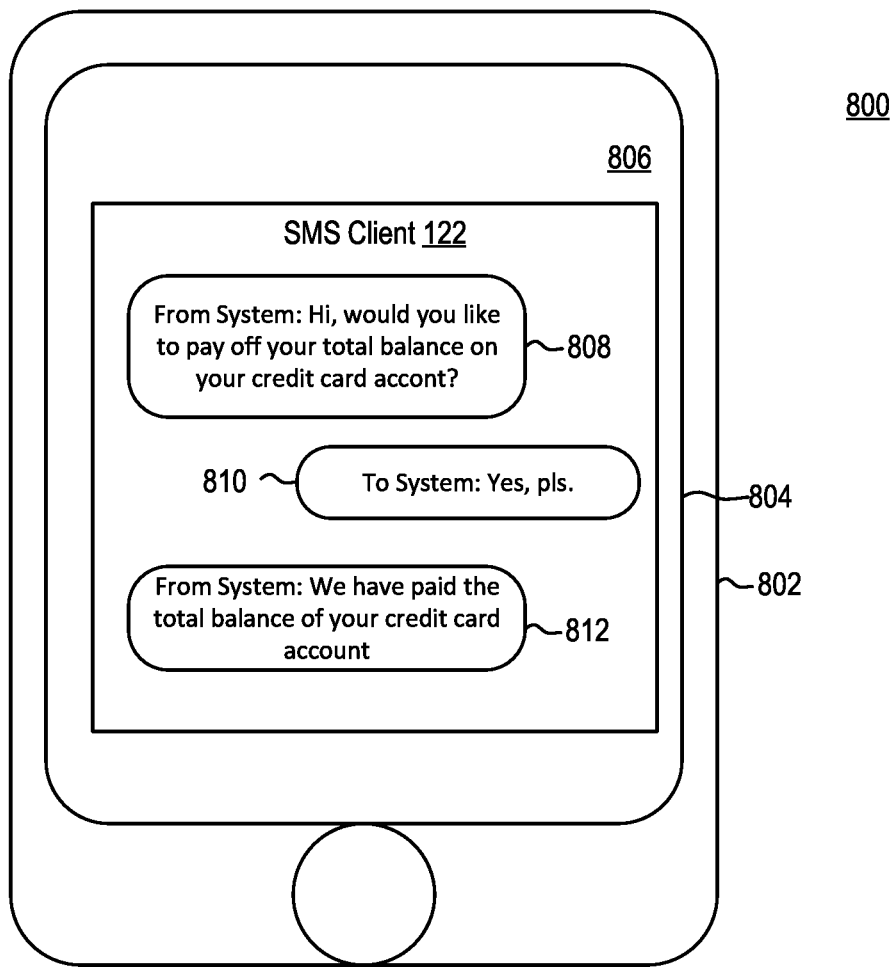
FIG. 8 is a block diagram illustrating a screenshot of a client device, according to one embodiment.

FIG. 8 is a block diagram 800 illustrating a screen shot of a client device 802, according to one embodiment. Client device 802 may correspond to client device 102. Block diagram 800 includes client device 802. Client device 802 may have a screen 804. In one embodiment, captured on screen 804 is a screenshot 806 of SMS client 122. As illustrated, SMS client 122 is displaying one or more text messages 808-812 between user and organization computing system 106. Message 808 corresponds to an anticipated message transmitted by organization computing system 106. Prediction device 115 may have determined that the anticipated user action is to make a payment on a credit card account. The proposed solution to this action would be to make the payment. Message 808 includes an indication of this proposed solution, by prompting user to make the payment. As illustrated, message 808 includes "Hi, would you like to pay off your total balance on your credit card account." User of client device 802 may generate a response message (i.e., response dialogue) 810. The response message from the user may include: "Yes, pls." Based off this response message, organization computing system 106 may make the credit card payment, and generate message 812 that confirms the payment with the user.

Figure 9:
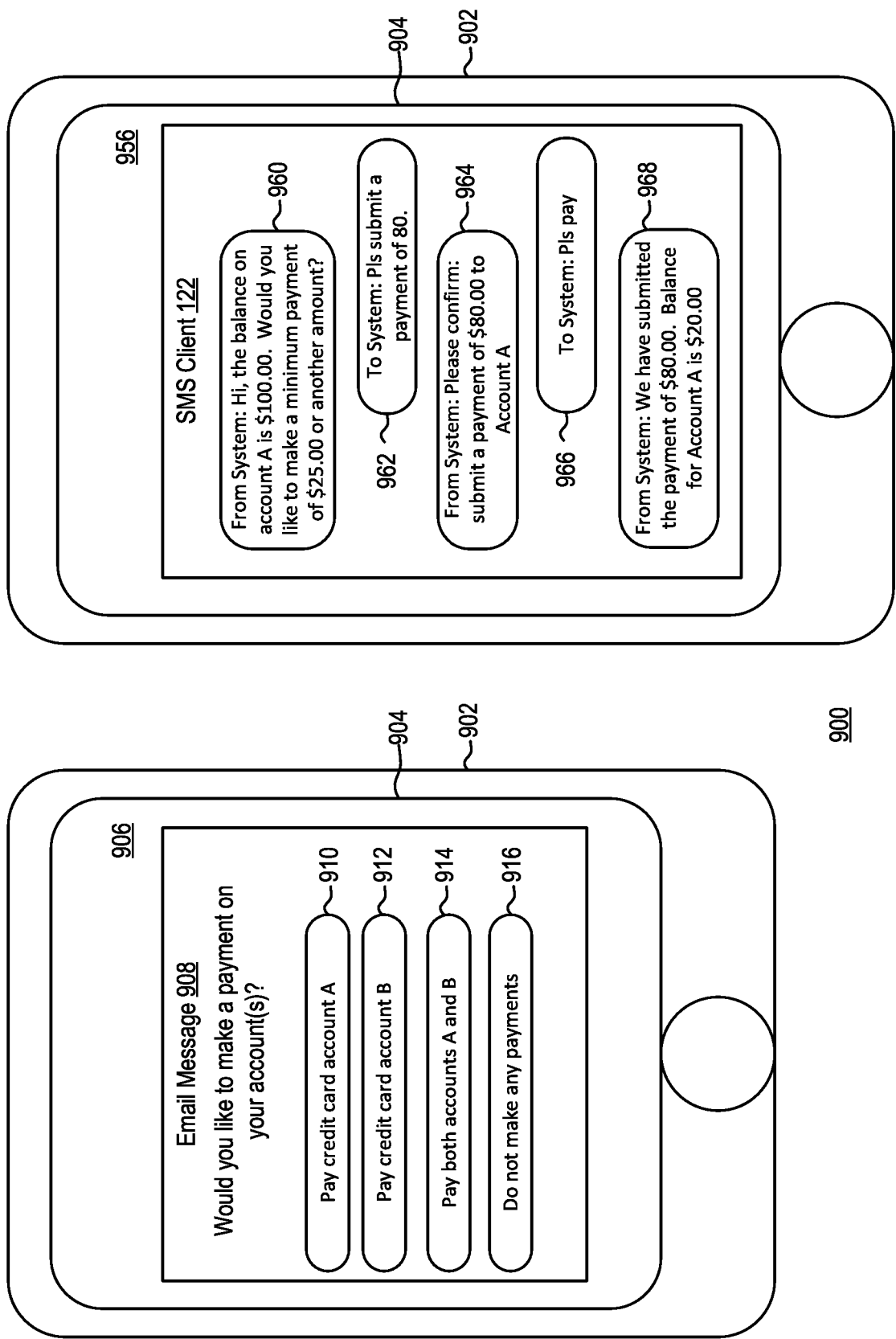
FIG. 9 is a block diagram illustrating one or more screenshots of a client device, according to one embodiment.

FIG. 9 is a block diagram 900 illustrating one or more screenshots of a client device 902, according to one embodiment. Client device 902 may correspond to client device 102. Block diagram 900 includes client device 902, which may correspond to client device 102 described above. Client device 902 has a screen 904. In one embodiment, captured on screen 904 is a screenshot 906 of user of client device 902 navigating user's email account. As illustrated, screenshot 902 includes an email message 908. Email message 908 may be generated and transmitted from organization computing system 106 to client device 902 via, for example, third party web server 104. Email message 908 may correspond to an anticipated message transmitted by organization computing system 106. Prediction device 115 may have determined that the anticipated user action is to make a payment on one or more of user's credit card accounts (e.g., Account A, Account B). The proposed solution to this action would be to make one or more payments. Email message 908 includes an indication of this proposed solution, by prompting user to make the payment.

As shown, email message 908 may include one or more pre-defined dialogue request prompts 910-916 embedded therein. Each dialogue request prompt 910-916 includes an underlying hyperlink generated by organization computing system 106. Each underlying hyperlink may include a user identifier corresponding to user of client device 902 and a request identifier corresponding to the dialogue request prompt. Upon selection of a dialogue request prompt 910-916 (e.g., upon selecting dialogue request prompt 910), client device 902 transmits an HTTP request to organization computing system 106 for subsequent processing.

In another embodiment, captured on screen 904 is screenshot 956 of client device 902, executing SMS client 122. Screenshot 956 illustrates an interactive chat session established between client device 902 and organization computing system 106. SMS client 122 may include one or more messages 960-968. Upon selecting dialogue request prompt 910, for example, organization computing system 106 may transmit a text message 960 to client device 902 in response to user's request. As illustrated, text message 960 may include a further question directed to the user. In this example, the further question is "Hi, the balance on Account A is $100.00. Would you like to make a minimum payment of $25.00 or another amount?" In response, user, via client device 902, may submit a text message 962 back to organization computing system 106 that recites "Pls submit a payment of 80." Organization computing system 106 may confirm the response by transmitting a text message 964 that recites "Please confirm: submit a payment of $80.00 to Account A." Client device 902 may submit a text message 966 confirming the amount. In response, organization computing system 106 may confirm the payment by transmitting a text message 968 that recites "We have submitted the payment of $80.00. Balance for Account A is $20.00." As such, the initial web-based communication channel established between organization computing system 106 and client device 902 has switched to a text message-based communication channel.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A method, comprising:
   identifying, by a computing system, a user action originating from a user device authorized to access an account of a user managed by the computing system;
   inputting, by the computing system, the user action into a prediction model configured to predict a future action to be taken by the user;
   determining, by the computing system and based on a prediction output from the prediction model, that the predicted future action is to be made by the user via a primary communication channel;
   determining, by the computing system, that a bandwidth of the primary communication channel can be reduced by identifying an alternate communication channel capable of processing the future action to be made by the user, wherein the alternate communication channel is a lower cost communication channel compared to the primary communication channel; and
   based on the determining, generating, by the computing system, a preemptive message to be transmitted to the user via the alternate communication channel before the user accesses the primary communication channel for performing the future action and transmitting the preemptive message to the user via the alternate communication channel.

2. The method of claim 1, wherein determining, by the computing system, that the bandwidth of the primary communication channel can be reduced by identifying the alternate communication channel capable of processing the future action to be made by the user comprises:
   identifying a complexity of addressing the predicted future action; and
   determining that the alternate communication channel can handle the complexity of the predicted future action.

3. The method of claim 1, wherein determining, by the computing system, that the bandwidth of the primary communication channel can be reduced by identifying the alternate communication channel capable of processing the future action to be made by the user comprises:
   identifying at least two alternate communication channels, the at least two alternate communication channels comprising the alternate communication channel and a second alternate communication channel; and
   determining that the second alternate communication channel is not capable of processing the future action to be made by the user.

4. The method of claim 1, wherein determining, by the computing system, that the bandwidth of the primary communication channel can be reduced by identifying the alternate communication channel capable of processing the future action to be made by the user comprises:
   identifying at least two alternate communication channels, the at least two alternate communication channels comprising the alternate communication channel and a second alternate communication channel; and
   determining that the second alternate communication channel has less bandwidth for processing the future action to be made by the user than the alternate communication channel.

5. The method of claim 1, wherein identifying, by the computing system, the user action originating from the user device authorized to access the account of a user managed by the computing system comprises:
   detecting a trigger event corresponding to a non-conversational action taken by the user.

6. The method of claim 1, wherein identifying, by the computing system, the user action originating from the user device authorized to access the account of the user managed by the computing system comprises:
   monitoring the user accessing a web page; and
   identifying the user action with respect to the web page.

7. The method of claim 1, wherein generating, by the computing system, the preemptive message to be transmitted to the user via the alternate communication channel comprises:
   embedding one or more predefined hyperlinks into the preemptive message to be transmitted to the user, wherein selection of one of the one or more predefined hyperlinks initiates a dialogue between the user and a virtual assistant.

8. A non-transitory computer readable medium including one or more sequences of instructions that, when executed by one or more processors, cause a computing system to perform operations comprising:
   identifying, by the computing system, a user action performed by a user remote from the computing system;
   predicting, by the computing system using a prediction model, a future action to be taken by the user based on the identified user action;
   determining, by the computing system, that the predicted future action is to be made by the user via a first communication channel;
   determining, by the computing system, that a bandwidth of the first communication channel can be reduced by identifying an alternate communication channel capable of processing the future action to be made by the user, wherein the bandwidth of the alternate communication channel is greater than the bandwidth of the first communication channel; and based on the determining, generating, by the computing system, a preemptive message to be transmitted to the user via the alternate communication channel before the user accesses the first communication channel for performing the future action and transmitting the preemptive message to the user via the alternate communication channel.

9. The non-transitory computer readable medium of claim 8, wherein determining, by the computing system, that the bandwidth of the first communication channel can be reduced by identifying the alternate communication channel capable of processing the future action to be made by the user comprises:
identifying a complexity of addressing the predicted future action; and
determining that the alternate communication channel can handle the complexity of the predicted future action.

10. The non-transitory computer readable medium of claim 8, wherein determining, by the computing system, that the bandwidth of the first communication channel can be reduced by identifying the alternate communication channel capable of processing the future action to be made by the user comprises:
identifying at least two alternate communication channels, the at least two alternate communication channels comprising the alternate communication channel and a second alternate communication channel; and
determining that the second alternate communication channel is not capable of processing the future action to be made by the user.

11. The non-transitory computer readable medium of claim 8, wherein determining, by the computing system, that the bandwidth of the first communication channel can be reduced by identifying the alternate communication channel capable of processing the future action to be made by the user comprises:
identifying at least two alternate communication channels, the at least two alternate communication channels comprising the alternate communication channel and a second alternate communication channel; and
determining that the second alternate communication channel has less bandwidth for processing the future action to be made by the user than the alternate communication channel.

12. The non-transitory computer readable medium of claim 8, wherein identifying, by the computing system, the user action comprises:
detecting a trigger event corresponding to a non-conversational action taken by the user.

13. The non-transitory computer readable medium of claim 8, wherein identifying, by the computing system, the user action comprises:
monitoring the user accessing a web page; and
identifying the user action with respect to the web page.

14. The non-transitory computer readable medium of claim 8, wherein generating, by the computing system, the preemptive message to be transmitted to the user via the alternate communication channel comprises:
embedding one or more predefined hyperlinks into the preemptive message to be transmitted to the user, wherein selection of one of the one or more predefined hyperlinks initiates a dialogue between the user and a virtual assistant.

15. A system comprising:
a processor; and
a memory having programming instructions stored thereon, which, when executed by the processor, causes the system to perform operations comprising:
identifying a user action performed by a user remote from the system;
inputting the user action into a prediction model configured to predict a future action to be taken by the user;
determining, based on a prediction output from the prediction model, that the predicted future action is to be made by the user via a primary communication channel;
determining that a bandwidth of the primary communication channel can be reduced by identifying an alternate communication channel capable of processing the future action to be made by the user, wherein the alternate communication channel is a lower cost communication channel compared to the primary communication channel; and
based on the determining, generating a preemptive message to be transmitted to the user via the alternate communication channel before the user accesses the primary communication channel for performing the future action and transmitting the preemptive message to the user via the alternate communication channel.

16. The system of claim 15, wherein determining that the bandwidth of the primary communication channel can be reduced by identifying the alternate communication channel capable of processing the future action to be made by the user comprises:
identifying a complexity of addressing the predicted future action; and
determining that the alternate communication channel can handle the complexity of the predicted future action.

17. The system of claim 15, wherein determining that the bandwidth of the primary communication channel can be reduced by identifying the alternate communication channel capable of processing the future action to be made by the user comprises:
identifying at least two alternate communication channels, the at least two alternate communication channels comprising the alternate communication channel and a second alternate communication channel; and
determining that the second alternate communication channel is not capable of processing the future action to be made by the user.

18. The system of claim 15, wherein determining that the bandwidth of the primary communication channel can be reduced by identifying the alternate communication channel capable of processing the future action to be made by the user comprises:
identifying at least two alternate communication channels, the at least two alternate communication channels comprising the alternate communication channel and a second alternate communication channel; and
determining that the second alternate communication channel has less bandwidth for processing the future action to be made by the user than the alternate communication channel.

19. The system of claim 15, wherein identifying the user action comprises:
detecting a trigger event corresponding to a non-conversational action taken by the user.

20. The system of claim 15, wherein identifying the user action comprises:
monitoring the user accessing a web page; and identifying the user action with respect to the web page.

* * * * *